(12) United States Patent
Periaswamy et al.

(10) Patent No.: US 7,912,292 B2
(45) Date of Patent: Mar. 22, 2011

(54) SYSTEM AND METHOD FOR FILTERING AND AUTOMATIC DETECTION OF CANDIDATE ANATOMICAL STRUCTURES IN MEDICAL IMAGES

(75) Inventors: Senthil Periaswamy, Exton, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1227 days.

(21) Appl. No.: 10/985,548

(22) Filed: Nov. 10, 2004

(65) Prior Publication Data

US 2005/0105800 A1 May 19, 2005

Related U.S. Application Data

(60) Provisional application No. 60/519,522, filed on Nov. 12, 2003.

(51) Int. Cl.
*G06K 9/00* (2006.01)
(52) U.S. Cl. .................. 382/190; 382/128; 382/182
(58) Field of Classification Search ................. 382/103, 382/190
See application file for complete search history.

(56) References Cited

U.S. PATENT DOCUMENTS

| | | | |
|---|---|---|---|
| 4,769,850 A | 9/1988 | Itoh et al. | |
| 5,797,396 A * | 8/1998 | Geiser et al. ............ | 600/407 |
| 6,842,638 B1 * | 1/2005 | Suri et al. ............... | 600/425 |
| 6,909,797 B2 * | 6/2005 | Romsdahl et al. ....... | 382/131 |
| 6,999,630 B1 * | 2/2006 | Drouot .................... | 382/262 |
| 7,010,163 B1 * | 3/2006 | Weiss ...................... | 382/168 |
| 7,187,810 B2 * | 3/2007 | Clune et al. ............. | 382/294 |
| 7,200,259 B1 * | 4/2007 | Gold et al. .............. | 382/149 |
| 7,574,024 B2 * | 8/2009 | Bitter et al. ............. | 382/128 |
| 2002/0114518 A1 * | 8/2002 | Wilt ......................... | 382/199 |
| 2003/0053667 A1 * | 3/2003 | Paragios et al. ......... | 382/128 |
| 2003/0095721 A1 * | 5/2003 | Clune et al. ............. | 382/294 |
| 2003/0161520 A1 * | 8/2003 | Yamano et al. ......... | 382/128 |
| 2003/0223627 A1 * | 12/2003 | Yoshida et al. ......... | 382/128 |
| 2004/0076324 A1 * | 4/2004 | Burl et al. ............... | 382/153 |
| 2004/0252870 A1 * | 12/2004 | Reeves et al. ........... | 382/128 |
| 2005/0232472 A1 * | 10/2005 | Scholze ................... | 382/124 |
| 2005/0259855 A1 * | 11/2005 | Dehmeshki ............. | 382/131 |
| 2006/0115146 A1 * | 6/2006 | Ogura et al. ............ | 382/159 |

FOREIGN PATENT DOCUMENTS

EP 0 405 457 A 1/1991

(Continued)

OTHER PUBLICATIONS

Hopf et al., "Accelerating 3D Convolution using graphics hardware," Oct. 24-29, IEEE, pp. 471-564.*

(Continued)

*Primary Examiner* — Samir A Ahmed
*Assistant Examiner* — John W Lee
(74) *Attorney, Agent, or Firm* — Peter Withstandley

(57) ABSTRACT

A system and method for determining the presence or absence of candidate objects in a digital image by computing a gradient field of the digital image and then applying predetermined filters to the gradient field to obtain a response image which can be further processed to detect the objects. The application of these filters to the digital image can be performed by convolution and the filters can be adapted based on the shape of the object to be searched.

16 Claims, 6 Drawing Sheets

FOREIGN PATENT DOCUMENTS

| JP | 62125481 A | 6/1987 |
|----|------------|--------|
| JP | 03027483 A | 5/1991 |
| JP | 03288278 A | 12/1991 |
| WO | WO 03/034176 A | 4/2003 |

OTHER PUBLICATIONS

Yoshida et al., "Three-Dimensional Computer-Aided Diagnosis Scheme for Detection of Colonic Polyps," 2001, IEEE, pp. 1261-1274.*

Suri et al., "White and Black Blood Volumetric Angiographic Filtering: Ellipsoidal Scale-Space Approach," Jun. 2002, IEEE Transaction on Information Technology in Biomedicine, vol. 6, pp. 142-158.*

Article entitled "Three-Dimensional Computer-Aided Diagnosis Scheme for Detection of Colonic Polyps" by Hiroyuki Yoshida et al., pp. 1261-1274.

Article entitled "Automated Detection and Classification of Breast Tumors" by Shun Leung Ng and Walter F. Bischof; pp. 218-237.

Article entitled "Finding Circles by an Array of Accumulators" by Carolyn Kimme et al.; pp. 120-122.

Kobatake et al., "Automatic Detection of Malignant Tumors on Mammogram", Proc. of the Int'l Conf. on Image Processing (ICIP), Nov. 13-16, 1994, Los Alamitos, IEEE Comp. Soc. Press, US, vol. 3, pp. 407-410.

Li et al., "Dynamic Programming Based Optical Edge Detection Algorithms on B-Scan Ultrasound Images", Journal of Shanghai Jiaotong University, Issue 7, vol. 36, pp. 970-974.

\* cited by examiner

SYSTEM AND METHOD FOR FILTERING AND AUTOMATIC DETECTION OF CANDIDATE ANATOMICAL STRUCTURES IN MEDICAL IMAGES

CROSS-REFERENCE TO RELATED APPLICATION

This application claims the benefit of U.S. Provisional Application No. 60/519,522 filed on Nov. 12, 2003, entitled as "DGFR: Filtering and Automatic Detection of Abnormal Anatomical Structures in Medical Images", content of which is fully incorporated herein by reference.

TECHNICAL FIELD

The present invention generally relates to medical image processing and more particularly to detecting candidate anatomical abnormalities as shown in medical images.

BACKGROUND

The field of medical imaging has seen significant advances since the time X-Rays were first used to determine anatomical abnormalities. Medical imaging hardware has progressed in the form of newer machines such as Magnetic Resonance Imaging (MRI) scanners, Computed Axial Tomography (CAT) scanners, etc. Because of large amount of image data generated by such modern medical scanners, there is a need for developing image processing techniques that automatically determine the presence of anatomical abnormalities in scanned medical images.

Recognizing anatomical structures within digitized medical images presents multiple challenges. First concern is related to the accuracy of recognition. Another concern is the speed of recognition. Because medical images are an aid for a doctor to diagnose a disease or condition, the speed of recognition is of utmost important to aid the doctor in reaching an early diagnosis. Hence, there is a need for improving recognition techniques that provide accurate and fast recognition of anatomical structures in medical images.

Digital medical images are constructed using raw image data obtained from a scanner, for example, a CAT scanner, MRI, etc. Digital medical images are typically either a 2-D image made of pixel elements or a 3-D image made of volume elements ("voxels"). Such 2-D or 3-D images are processed using medical image recognition techniques to determine presence of anatomical structures such as cysts, tumors, polyps, etc. However, given the amount of image data generated by any given image scan, it is preferable that an automatic technique should point out anatomical features in the selected regions of an image to a doctor for further diagnosis of any disease or condition.

Feature based recognition techniques are used to determine presence of anatomical structures in medical images. However, feature based recognition techniques suffer from accuracy problems. Hence, there is a need for non-feature based recognition techniques that provide improved recognition of anatomical features in medical images.

SUMMARY

One exemplary embodiment of the invention is a method for determining the presence of predetermined objects within a digital image is provided. The method comprises computing a gradient field of the digital image and applying at least one predetermined mask to the gradient field. Further, the method involves generating a response image from the application of filter to the gradient field. The method then determines the presence of at least one predetermined object from the response image.

In another exemplary embodiment of the invention, a method is provided where the gradient field has a X-component, a Y-component and a Z-component corresponding to the X, Y and Z axes of the digital image and the mask includes a X-filter, a Y-filter and a Z-filter. A vector convolution is generated by applying the X filter to the X-component, the Y filter to the Y-component and the Z-filter to the Z-component to generate three response image components. These three response image components are added to generate the response image.

In yet another exemplary embodiment of the invention a method detects spherical and semi-spherical objects in the digital image. In another aspect of the invention a method detects elliptical and semi-elliptical objects in the digital image.

BRIEF DESCRIPTION OF DRAWINGS

Exemplary embodiments of the invention are described with reference to the accompanying drawings, of which.

DETAILED DESCRIPTION OF THE EXEMPLARY EMBODIMENTS

Figure 1:
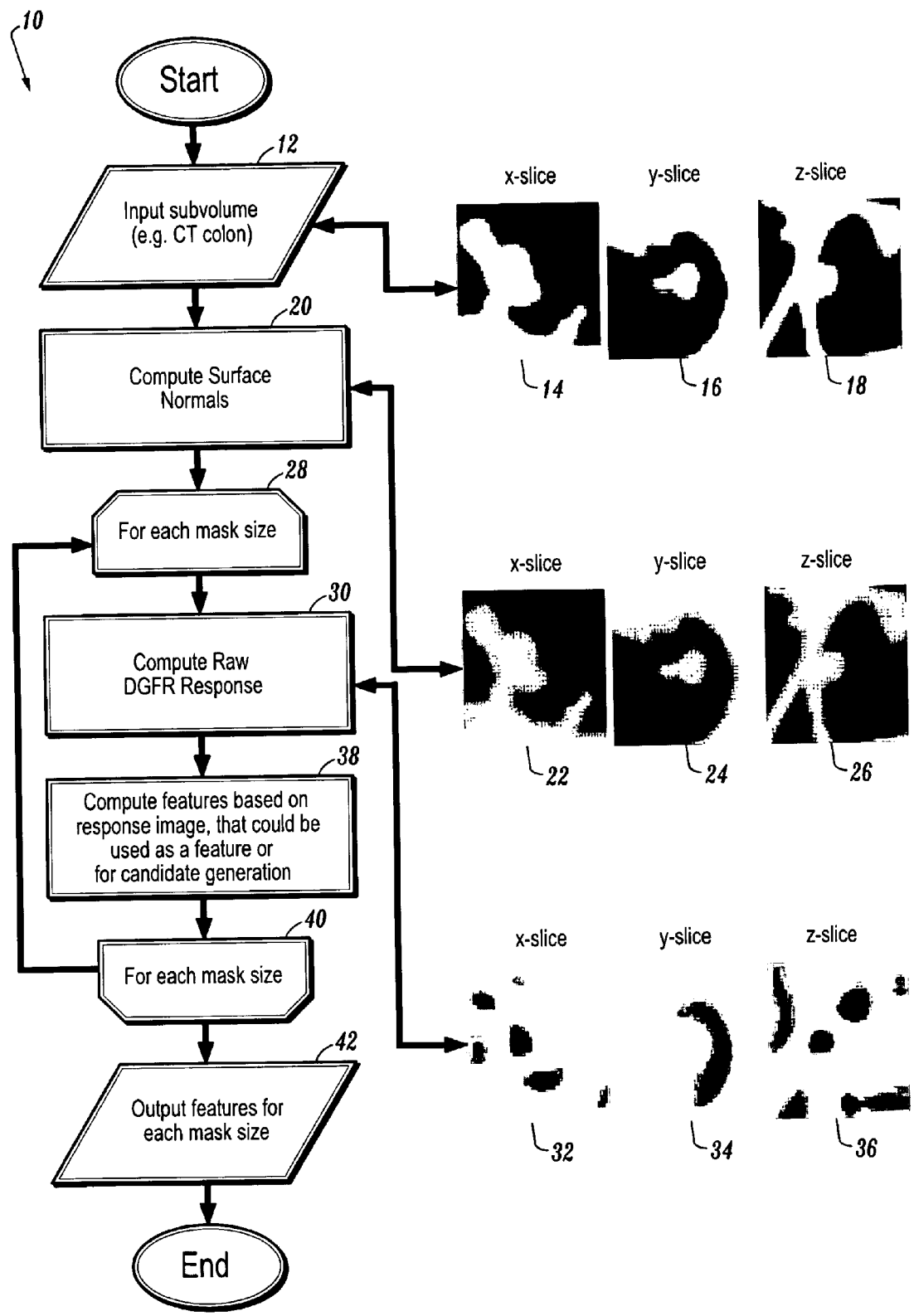
FIG. 1 is a flow-chart showing a Divergent Gradient Field Response (DGFR) process applied to an exemplary colon in an exemplary embodiment of the present invention.

FIG. 1 is a flow-chart 10 showing a Divergent Gradient Field Response (DGFR) process according to an exemplary embodiment of the invention as applied to an exemplary colon. An image obtained from an image modality is treated as an input volume. To illustrate, a CAT scan of an exemplary polypoid lesion inside a colon is considered. The CAT scan has a 3-D representation. The image section showing the colon is considered as a sub-volume of the input image volume at step 12. Three slices 14, 16 and 18 show the exemplary colon's X, Y and Z slices in the input sub-volume which is three-dimensional.

At step 20 surface normals are calculated for the sub-volume showing the colon. The surface normals are represented in an image form as X, Y and Z slices 22, 24 and 26. The gradient fields are computed in step 20. The gradient field calculation is performed on the complete volume. Strongest gradient field magnitude is obtained in the transition area between different tissues and organs. The transition is imaged by image modality (e.g., a CT, MRI or PET scan) as an intensity change. In the present example of a colon, the intensity change is indicated as a transition between the tissue and the lumen. Multiple techniques exist to calculate the gradient fields and any one of such techniques can be used for this purpose.

Thereafter, masks of varying sizes are applied to the surface normalized image. The number of masks can be one or more and the types of masks to be used will depend on the candidate anatomical feature that is being searched. In the present illustration, to determine lesions in the colon, spherical and semi-spherical candidates are to be searched in the input image. Therefore, the masks for such an application are designed to search spherical or semi-spherical objects within the input image.

The gradient field of an object that is spherical or semi-spherical diverges relative to the centroid of the object. When this object is convolved with a vector field of a mask of a given size that is diverging, a response volume is obtained. This response image can be used to characterize spherical or semi-spherical objects.

Steps 28 and 40 form a loop that iterates for all mask sizes. For each iteration a single mask is applied to the surface normalized image to compute raw DGFR responses at step 30. The raw DGFR response image is shown as image slices 22, 24 and 26 representing X, Y and Z slices respectively. The raw DGFR response is calculated by a convolution of surface normals with filters, a process that will be described below in detail.

The diverging gradient field response is computed using the formula:

$$DGFR(i, j, k) = \sum_{z \in \Omega}\sum_{y \in \Omega}\sum_{x \in \Omega} V_x(x, y, z) f_x(i-x, j-y, k-z) + \\ \sum_{z \in \Omega}\sum_{y \in \Omega}\sum_{x \in \Omega} V_y(x, y, z) f_y(i-x, j-y, k-z) + \\ \sum_{z \in \Omega}\sum_{y \in \Omega}\sum_{x \in \Omega} V_z(x, y, z) f_z(i-x, j-y, k-z) \quad (I)$$

where, $$V_x(x,y,z) = x/\sqrt{(x^2+y^2+z^2)},$$

$$V_y(x,y,z) = y/\sqrt{(x^2+y^2+z^2)},$$

$$V_z(x,y,z) = z/\sqrt{(x^2+y^2+z^2)},$$

$$\Omega = [-\text{floor}(\text{maskSize}/2) \text{ to } +\text{floor}(\text{maskSize}/2)],$$

and $f_x$, $f_y$, $f_z$ are the components of the gradient field.

Then, at step 38 the raw DGFR response image is used to compute features that can used to recognize the presence of any candidate lesion in the colon. For example, features such as sphericity and maximum response region can be computed to determine presence of lesions having spherical or semi-spherical shapes. At step 42, after the loop of steps 28 and 40 has iterated for all mask sizes, the features corresponding to all mask sizes that are found during DGFR processing are sent to an output device or medium. Finally, based on the response image, features can be computed, and used for either candidate generation or can be used as an input to a classifier.

In the above Equation (I), the intermediate response images are represented as $DGFR_x$, $DGFR_y$, $DGFR_z$ while $\Omega$ is the domain of all valid coordinates in the image. The intermediate response images are combined to form the final response image. The combination can be performed using multiple techniques. For example, one technique involves adding the intermediate response images. This addition is expressed below as:

$$DGFR(x,y,z) = DGFR_x(x,y,z) + DGFR_y(x,y,z) + DGFR_z(x,y,z) \text{ for } x,y,z \in \Omega$$

Further, the intermediate response images can be further processed or combined using either a single function G or a combination of functions F(G . . . ). Typical examples of such functions are absolute value and squaring. Many other functions can be used. Application of an absolute value function to combine intermediate response images is expressed as:

$$DGFR(x,y,z) = \text{Abs}(DGFR_x(x,y,z)) + \text{Abs}(DGFR_y(x,y,z)) + \text{Abs}(DGFR_z(x,y,z)) \text{ for } x,y,z \in \Omega$$

Similarly, application of an absolute value function to combine intermediate response images is expressed as:

$$DGFR(x,y,z) = \text{Square}(DGFR_x(x,y,z)) + \text{Square}(DGFR_y(x,y,z)) + \text{Square}(DGFR_z(x,y,z)) \text{ for } x,y,z \in \Omega$$

While, the above Equation (I) is described for three-dimensional digital image, the equation with filters and gradient fields can be applied to two-dimensional or binary digital images where the z-component of the filters and gradient images is dropped and only x and y components are used to calculate the DFGR response image. Further, a DGFR a process can be applied to any number of image dimensions typical examples of which are 2-D, 3-D and 4-D images.

In the present example, filters $V_x(x,y,z)$, $V_y(x,y,z)$ $V_z(x,y,z)$ are designed to detect spherical or semi-spherical objects. However, any appropriate filters can be used to determine a particular shape of the candidate object. For example, elliptical and semi-elliptical objects filters can be designed as below:

$$V_x(x,y,z) = a \cdot x/\sqrt{(x^2+y^2+z^2)},$$

$$V_y(x,y,z) = b \cdot y/\sqrt{(x^2+y^2+z^2)},$$

$$V_z(x,y,z) = c \cdot z/\sqrt{(x^2+y^2+z^2)}$$

or using approximations of above functions.

A DGFR process applied in an exemplary embodiment of the invention is used to detect spherical or semi-spherical objects in an image volume. A DGFR process is an intuitive technique that relies on the nature of the image gradient fields to detect anatomical features in images rather than a feature based approach that relies on specific features of objects (such as sphericity) to be detected. A DGFR process is both an approach for filtering, i.e., highlighting, in its simplest form, as well as a sophisticated algorithm to perform automatic detection of abnormal anatomical structures such as colonic polyps, aneurisms, lung nodules, etc. In addition, it can be used to obtain other descriptive characteristics of a candidate lesion useful for its identification and classification.

Vector convolution of a diverging gradient field with an image having a spherical or semi-spherical object produces a high response. Gradient field of objects having spherical or semi-spherical shapes typically diverges at all possible points.

Figure 2:
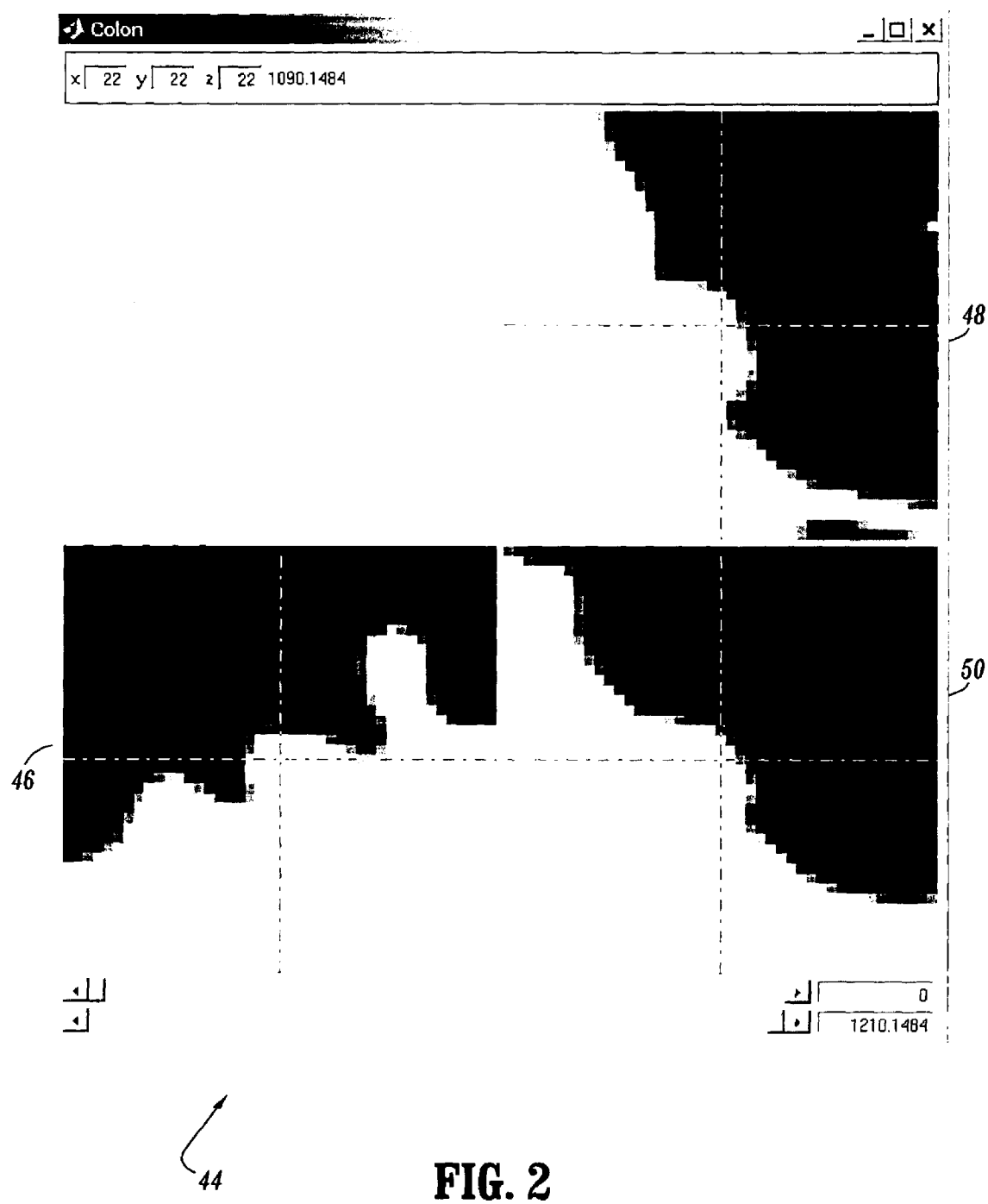
FIG. 2 shows the exemplary colon region in the original input image according to an exemplary embodiment.

FIG. 2 shows the exemplary colon region in the original input image. The input image 44 is shown in three separate panes as viewed from X, Y and Z axes. Pane 46 shows the X-axis view of the colon region in the input image; pane 48 shows the Y-axis view of the colon; and pane 50 shows the Z-axis view of the colon.

Figure 3:
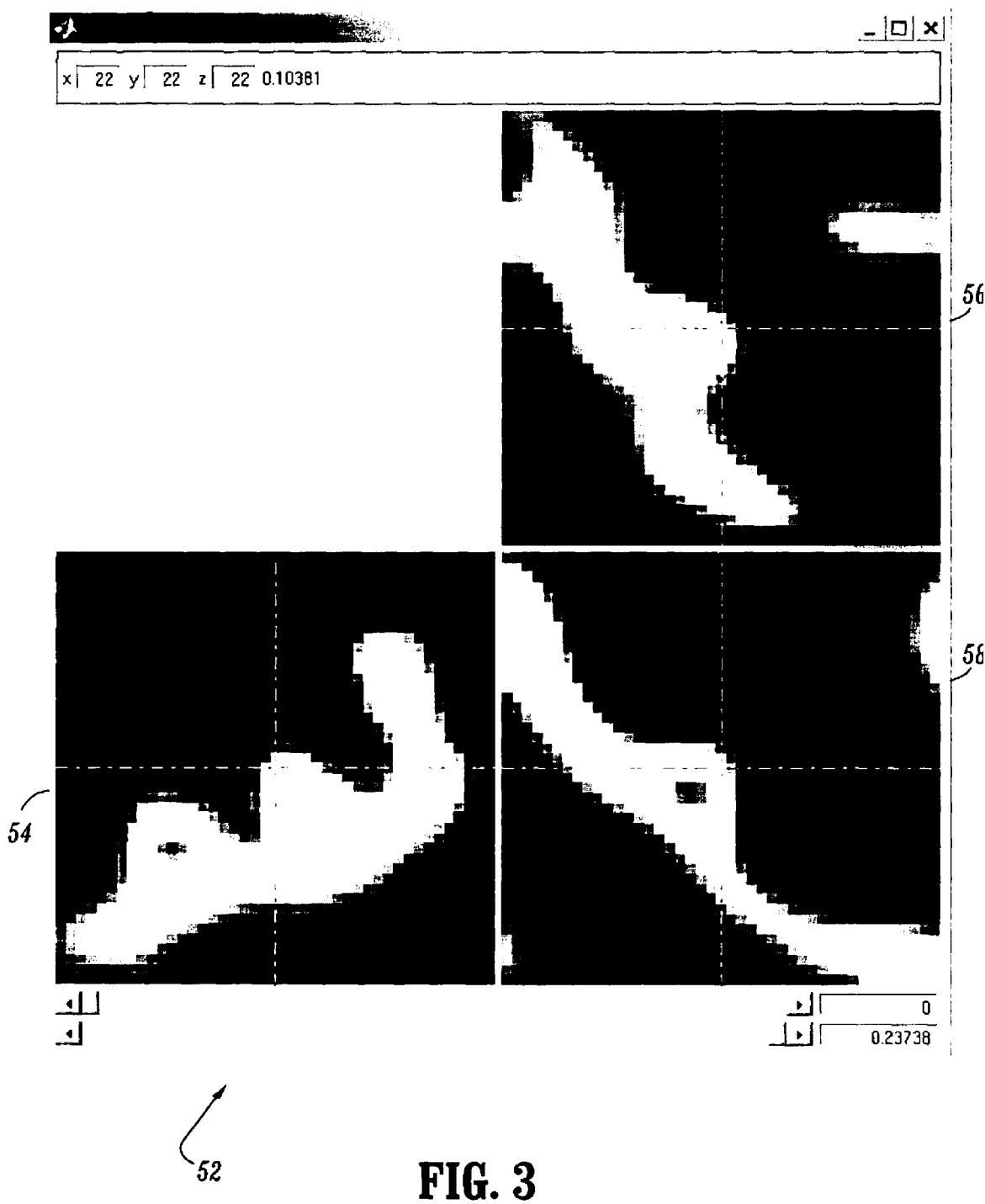
FIG. 3 shows gradient fields superimposed on the colon region according to an exemplary embodiment of the present invention.

FIG. 3 shows gradient fields superimposed on the colon region. The gradient field image 52 is obtained by using the Equation (I) as described above. Pane 54 represents the $f_x$ component in the Equation (I); Pane 56 represents the $f_y$ component of the Equation (I); and Pane 58 represents the $f_z$ component of the Equation (I). The small, individual and diverging arrows shown within the panes 56-58 represent the gradients. Each gradient as represented by an arrow has a x, y and z component. Hence, the gradient field is represented by the $f_x$, $f_y$ and $f_z$ components of gradient field in the Equation (I).

Figure 4:
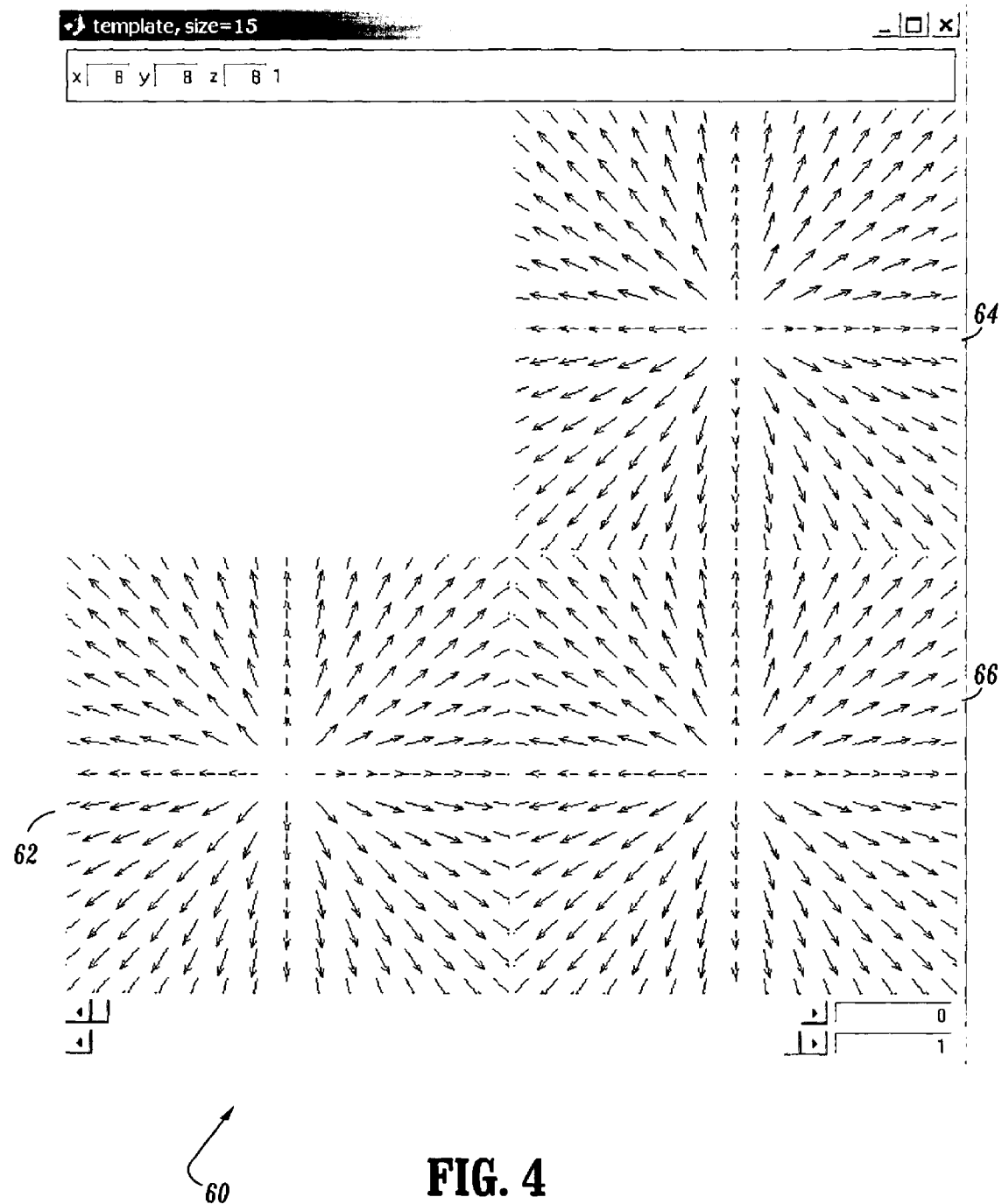
FIG. 4 shows an exemplary mask that is superimposed on the gradient field to perform a DGFR process according to an exemplary embodiment of the present invention.

FIG. 4 shows an exemplary mask that is super-imposed on the gradient field to perform a DGFR process according to an exemplary embodiment of the invention. The mask image 60 represents an exemplary three-dimensional vector mask of size 15×15×15 used to detect spherical or semi-spherical lesions in the colon from the given input image. The mask shown here is only an illustration and any size and type of mask can be used depending upon the application.

Pane 62 represents the filter $V_x(x,y,z)$; pane 64 represents the filter $V_y(x,y,z)$; and pane 66 represents the filter $V_z(x,y,z)$ in the equation (I). These filters forming the mask image 60 are convolved with the $f_x$, $f_y$ and $f_z$ components of gradient field in the Equation (I) above.

Three dimensional convolution is a computationally expensive procedure. Hence, the filters ($V_x(x,y,z)$, $V_y(x,y,z)$, $V_z(x,y,z)$) for each separate axes are used. Further, approximations of such filters can also be applied. Each of these linearly separable filters are individually convolved, typically by taking vector inner product, with the $f_x$, $f_y$ and $f_z$ components of gradient field and then added to achieve a DGFR response in an exemplary embodiment of the invention. Hence, using separable filters provides a relatively faster method that is computationally less expensive in calculating a DGFR response image in exemplary embodiment of the invention.

Figure 5:
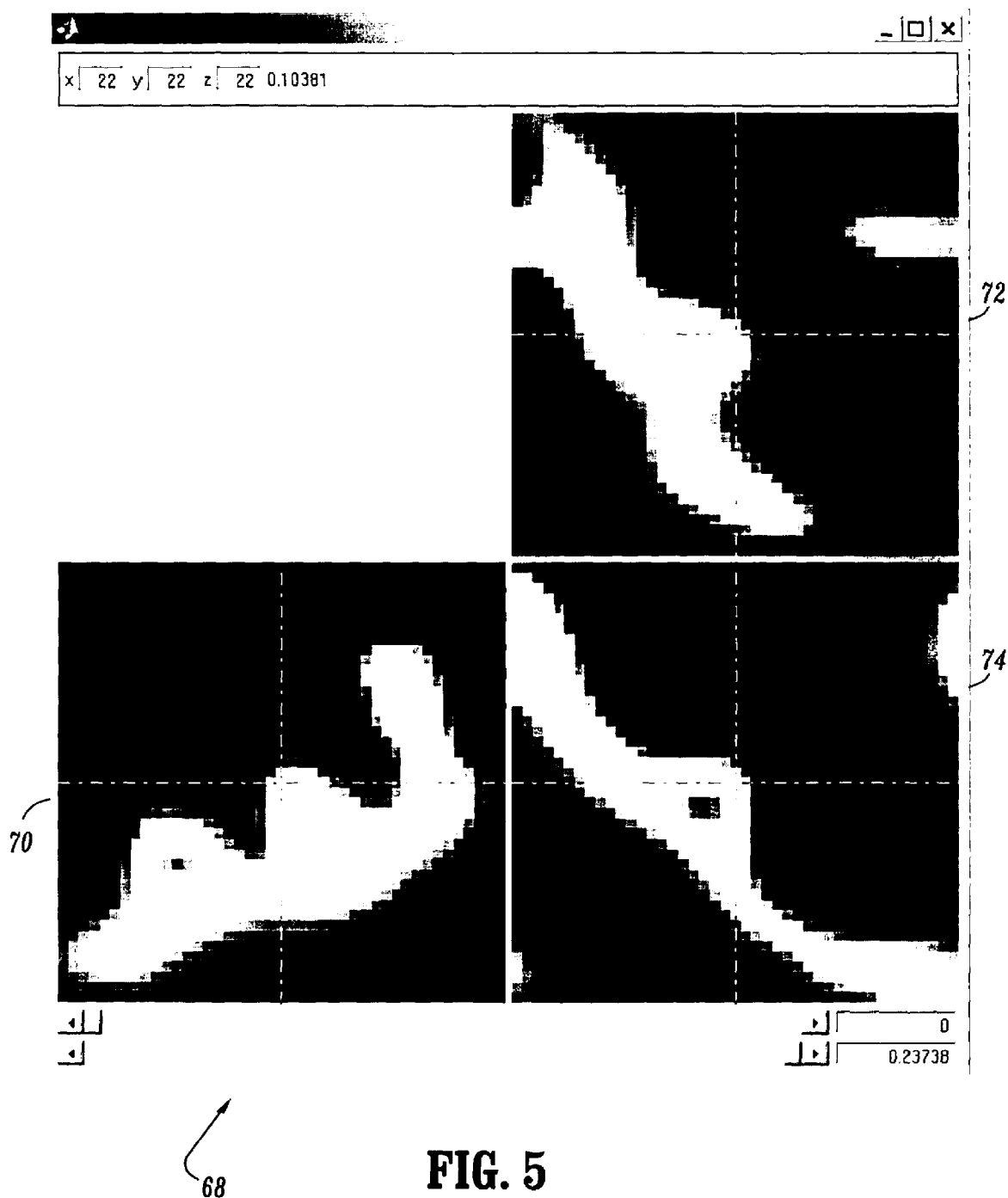
FIG. 5 shows DGFR response images obtained by convolution of filters and the gradient field according to an exemplary embodiment of the present invention.

FIG. 5 is an exemplary depiction of DGFR response images obtained by the convolution of filters and the gradient field according to an exemplary embodiment of the present invention. The lesion (polyp) in the response image is highlighted by high values. The panes 70, 72 and 74 represent a 3-D view of the response image from X, Y and Z axis respectively. Pane 70 shows a DGFR response along the X-plane; pane 72 shows a DGFR response along the Y-plane and the pane 74 shows the DGFR response along the Z-plane.

In the present example, masks with odd sizes varying from 5×5×5 to 25×25×25 are used to compute a response. Multiple mask sizes are used so that for a given size polyp, multiple masks that are smaller and larger in size than the given polyp, will provide better responses. All possible shifts of the masks are used to compute the vector convolution to obtain the response volume. These responses are then integrated to generate a single response volume. Thus, response images are generated as a result of convolution of the template masks with the derivative image.

The response image can be further processed. For example, for each of these responses a threshold is applied and the shape of the resulting response image is analyzed. In particular, the thresholded response is approximated to an ellipsoid using Eigen-value decomposition, and the ratio of the largest Eigen-value to the smallest Eigen-value is estimated. This value gives an estimate as to the sphericity of the response and can be used as a feature (along with other statistics of the response in a given region).

Figure 6:
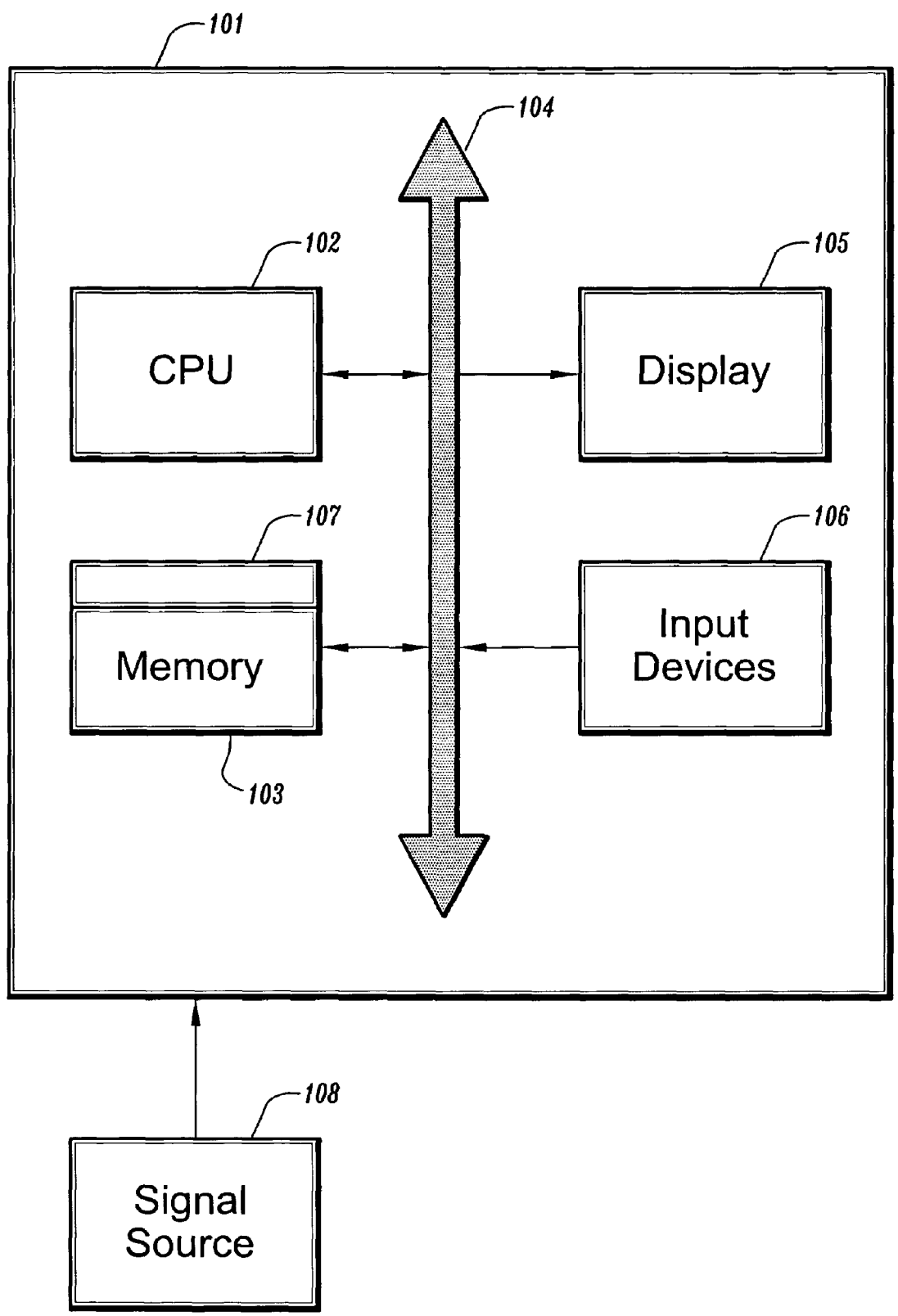
FIG. 6 shows an exemplary computer system according to an to exemplary embodiment of the present invention.

Referring to FIG. 6, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for detecting an anatomical abnormality within a three-dimensional digital image, the method comprising:
    computing a first gradient vector field of the digital image in x, y, and z directions;
    computing a plurality of second gradient vector fields for each of a plurality of predetermined masks of different sizes;
    convoluting the first gradient vector field and the plurality of second gradient vector fields to generate a corresponding set of response images;
    integrating the set of response images to generate a single response volume; and
    detecting the anatomical abnormality based on the single response volume, wherein each of the plurality of predetermined masks of different sizes is selected according to a shape of the anatomical abnormality being detected.

2. The method of claim 1 wherein the shape of the anatomical abnormality being detected is spherical or semi-spherical.

3. The method of claim 1, wherein the three-dimensional digital image is a digital medical image.

4. The method of claim 3, wherein the digital medical image is a CT scan, an MRI or a PET scan.

5. The method of claim 1, wherein the set of response images are Divergent Gradient Field Response (DGFR) images.

6. The method of claim 5, wherein the DGFR response images are final response images and are first represented as intermediate response images: DGFRx, DGFRy, and DGFRz, for each corresponding axis, wherein the intermediate response images are combined to form the final response images.

7. The method of claim 6, wherein the intermediate response images are further processed or combined using either a single function or a combination of functions.

8. The method of claim 1, wherein detecting the anatomical abnormality based on the single response volume includes analyzing a shape of the single response volume.

9. A computer system comprising:
a processor; and a program storage device readable by the computer system, embodying a program of instructions executable by the processor to perform method steps for detecting an anatomical abnormality within a three-dimensional digital image, the method comprising:
computing a first gradient vector field of the digital image in x, y, and z directions;
computing a plurality of second gradient vector fields for each of a plurality of predetermined masks of different sizes;
convoluting the first gradient vector field and the plurality of second gradient vector fields to generate a corresponding set of response images;
integrating the set of response images to generate a single response volume; and
detecting the anatomical abnormality based on the single response volume, wherein each of the plurality of predetermined masks of different sizes is selected according to a shape of the anatomical abnormality being detected.

10. The computer system of claim 9, wherein the shape of the anatomical abnormality being detected is spherical or semi-spherical.

11. The computer system of claim 9, wherein the three-dimensional digital image is a digital medical image.

12. The computer system of claim 11, wherein the digital medical image is a CT scan, an MRI or a PET scan.

13. The computer system of claim 9, wherein the set of response images are Divergent Gradient Field Response (DGFR) images.

14. The computer system of claim 13, wherein the DGFR response images are final response images and are first represented as intermediate response images: DGFRx, DGFRy, and DGFRz, for each corresponding axis, wherein the intermediate response images are combined to form the final response images.

15. The computer system of claim 14, wherein the intermediate response images are further processed or combined using either a single function or a combination of functions.

16. The method of claim 9, wherein detecting the anatomical abnormality based on the single response volume includes analyzing a shape of the single response volume.

* * * * *